United States Patent
Kallio

[15] 3,662,162
[45] May 9, 1972

[54] SUM OR DIFFERENCE ANGLE COMPUTATION APPARATUS

[72] Inventor: Frank H. Kallio, Black Canyon City, Ariz.
[73] Assignee: Sperry Rand Corporation
[22] Filed: Apr. 24, 1970
[21] Appl. No.: 31,544

[52] U.S. Cl. ............................ 235/186, 235/189, 328/167
[51] Int. Cl. ........................................................ G06g 7/22
[58] Field of Search .................. 235/194, 186, 189, 150.26, 235/150.27; 318/629; 328/165, 166, 167, 160, 161, 133

[56] References Cited

UNITED STATES PATENTS

| | | | |
|---|---|---|---|
| 3,078,042 | 2/1963 | Grado | 235/189 X |
| 3,311,738 | 3/1967 | Makow | 235/186 X |
| 3,358,127 | 12/1967 | Dolan | 235/186 X |
| 3,464,016 | 8/1969 | Kerwin et al. | 235/186 X |
| 3,465,135 | 9/1969 | Belstering et al. | 235/186 X |

*Primary Examiner*—Joseph F. Ruggiero
*Attorney*—S. C. Yeaton

[57] ABSTRACT

Apparatus for providing a signal representative of a trigonometric function of the sum or difference between two angle variables including a pair of linear combiners responsive to respective input trigonometric functions of the angle variables and a multiplier connected to receive the combiner outputs for producing a resultant product signal containing d.c. and second harmonic components in addition to the desired trigonometric function, the latter being readily separated from the remainder of the signal by means of appropriate frequency selective apparatus connected to the multiplier output.

9 Claims, 2 Drawing Figures

SUM OR DIFFERENCE ANGLE COMPUTATION APPARATUS

BACKGROUND OF THE INVENTION

1. Field of the Invention

The present invention relates to apparatus for providing a signal proportional to a trigonometric function of the sum or difference between two angle variables and more particularly to apparatus responsive to angle data signals represented by cyclically varying input functions, such as sine and cosine, for providing an output signal which is proportional to the sine or cosine of the sum or difference between the two angle variables.

It will be appreciated that apparatus capable of producing a signal proportional to a function of an angle sum or difference will have wide applicability as a computational device. Such apparatus is especially useful, for example, in navigation systems for aircraft and other vehicles wherein considerable manipulation of angular data is performed. More specifically, with regard to a navigational system, a circuit capable of providing a signal proportional to a function of the sum or difference between two angles in response to signals representative of sine and cosine functions of the angles can be used in a gyro-magnetic compass system, as explained in copending U.S. Patent application Ser. No. 790,987, now U.S. Pat. No. 3,576,986 filed in the name of D. R. Brickner et al., and assigned to the assignee of the present invention, for the purpose of combining long-term compass information derived from a flux valve with short-term gyroscopic information obtained from a stable platform to produce output signals proportional to the sine of the angular difference between the compass and gyro data.

2. Description of the Prior Art

Heretofore the implementation of apparatus for performing calculations of the type to which the present invention pertains have usually involved electro-mechanical servo devices, although more recently all electronic devices have been devised. In the aforementioned Brickner et al. application, for instance, a prior art circuit is described wherein one multiplier is used to provide a signal (sine $\theta$ cosine $\psi$) derived from individual sine and cosine functions of $\theta$ and $\psi$ respectively. Another multiplier is used in a similar manner to provide a signal (sine $\psi$ cosine $\theta$). The multiplier output signals are then linearly combined to produce the difference angle signal sine ($\psi - \theta$). Since the major complexity of the prior art circuit resides in the multipliers, it would be advantageous from the viewpoint of size, cost and reliability if an alternative circuit configuration utilizing less than two multipliers could be designed for obtaining the desired result, namely a signal proportional to a function of the sum or difference between the angle variables. In addition, accuracy would be improved since both input signals would be scaled by the same multiplier coefficients. These features are realized with the present invention.

SUMMARY OF THE INVENTION

A preferred embodiment of the present invention comprises a pair of combiners for forming linear combinations of input trigonometric functions of two angle variables and a multiplier for generating the desired sum or difference signal as a product of linear combinations of the input functions. The input trigonometric functions of one of the angle variables are amplitude modulation factors of a prescribed carrier frequency signal while the input functions of the other angle variable are superimposed on a different carrier frequency, typically d.c., to facilitate discrimination therebetween. When the linear combinations of the input signals, as provided by the respective combiners, are applied to the multiplier, a composite product signal is generated at the multiplier output including the desired function of the angle variables in the form of an amplitude modulation of the prescribed carrier frequency in addition to d.c. components proportional to the respective input angles and an amplitude modulated second harmonic component of the carrier frequency. A frequency selective apparatus such as a bandpass filter connected to the multiplier output readily separates the desired difference angle carrier frequency signal from the remaining d.c. and second harmonic components of the composite signal.

DESCRIPTION OF THE PREFERRED EMBODIMENT

Figure 1:
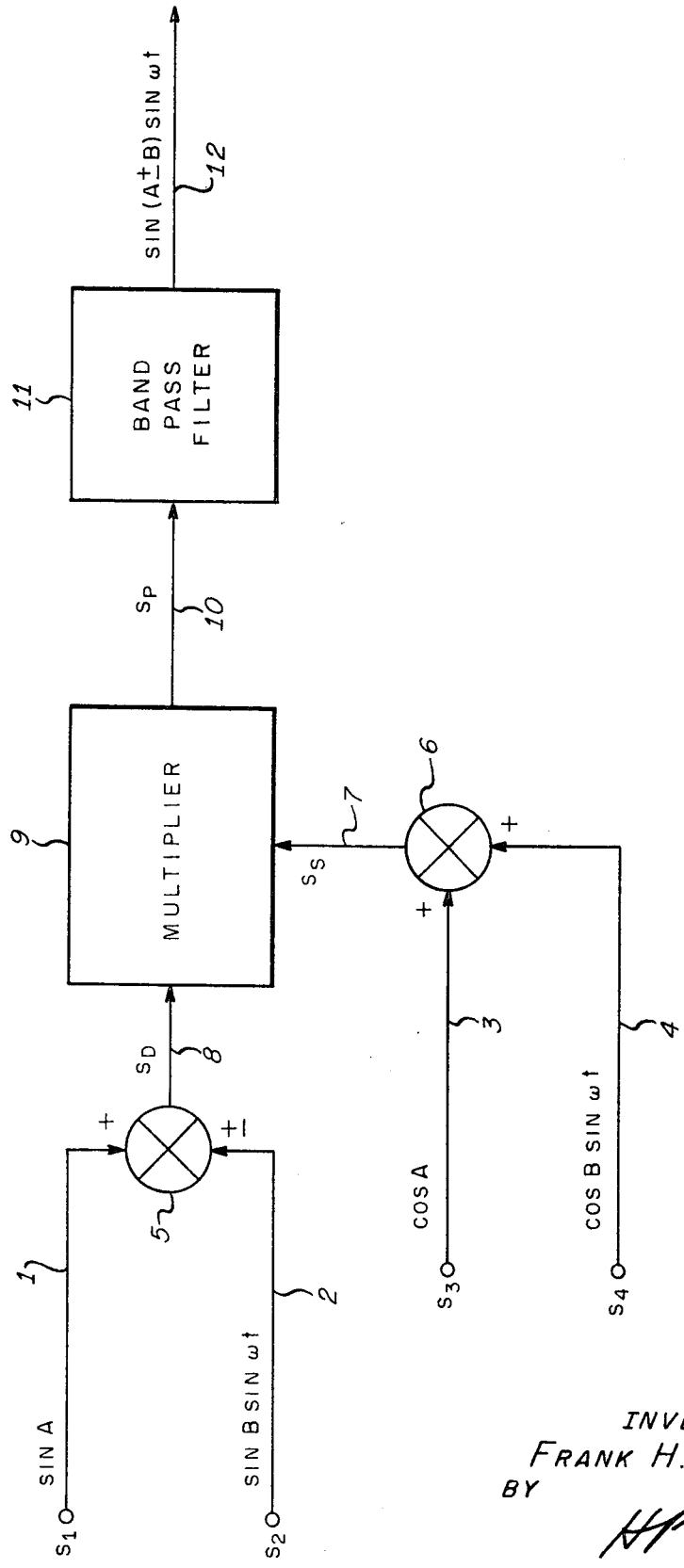
FIG. 1 is a block diagram illustrative of computational apparatus constructed in accordance with the principles of the present invention.

Referring to FIG. 1, input trigonometric functions of angle variables, derived for example, from a flux valve or gyro, are provided as signals $S_1$, $S_2$, $S_3$ and $S_4$ for application respectively to input leads 1, 2, 3 and 4, where as indicated $S_1 = \sin A$
$S_2 = \sin B \sin wt$
$S_3 = \cos A$
$S_4 = \cos B \sin wt$ and $w$ designates a given carrier frequency, for instance 400 or 800 cps for typical aircraft applications, such that the sine B and cosine B functions constitute amplitude modulation factors of the carrier frequency component sin wt. Although the input functions of angle variable A, namely signals $S_1$ and $S_3$, are shown modulated on a d.c. carrier, it should be understood that this limitation is not essential to the inventive concept. It is essential, however, that the respective angle variables be modulated on different carrier frequencies, as will become apparent from the following discussion. Signals $S_1$ and $S_2$ are linearly combined in combiner 5 to produce a sum or difference signal at the output thereof represented by $S_D = \sin A \pm \sin B \sin wt$ Choice of the sign of signal $S_2$ applied to combiner 5 is determined by the desired output, that is, the signal will be minus for a difference signal and plus for a sum signal. In a similar manner, signals $S_3$ and $S_4$ are linearly combined in combiner 6 to produce a sum signal represented by $S_S = \cos A + \cos B \sin wt$ The signal combinations ($S_D$ and $S_S$) in turn are coupled by leads 7 and 8 to the inputs of multiplier 9 which provides on its output lead 10 a composite product $S_P$ signal of the form $S_P = (\sin A \pm \sin B \sin wt)(\cos A + \cos B \sin wt)$
$= \sin 2A/2$
$+ \sin A \cos B \sin wt$
$\pm \sin B \cos A \sin wt$
$\pm \sin 2B/2 \sin^2 wt$ which can be reduced by simple trigonometric manipulation to $S_P = \sin 2A/2 \pm \sin 2B/4 \pm \sin 2B/4 \cos 2wt$
$+ \sin(A \pm B) \sin wt$ The first and second terms of the right side of the preceding equation are d.c. terms proportional to the sine of twice the respective input angles while the third term is a second harmonic of the carrier frequency amplitude modulated in accordance with a sine function of one of the input angles, namely angle B. The fourth term contains the desired sum or difference angle function as an amplitude modulation of a signal component at the carrier frequency. The latter signal component, that is the desired sine of the sum or difference of angles signal, is thus easily separable from the d.c. and second harmonic components by means of a frequency selective apparatus such as a synchronous demodulator or a bandpass filter 11 which rejects the d.c. and second harmonic components of the multiplier composite output signal and passes solely the carrier frequency component whereby the latter is provided on output lead 12 for application to external utilization apparatus.

It is therefore seen that an output signal of the desired format can be obtained by means of a single multiplier cooperating with linear combining circuits manipulating input data having prescribed characteristics. Other trigonometric functions capable of manipulation in the manner of sine and cosine functions can also be used to represent the input and it should now be apparent that it is essential for the respective input variables to be presented on discrete carrier frequency signals in order to achieve separation of the sum or difference signal from the other multiplier output components by means of the simple bandpass filtering technique described hereinabove.

Figure 2:
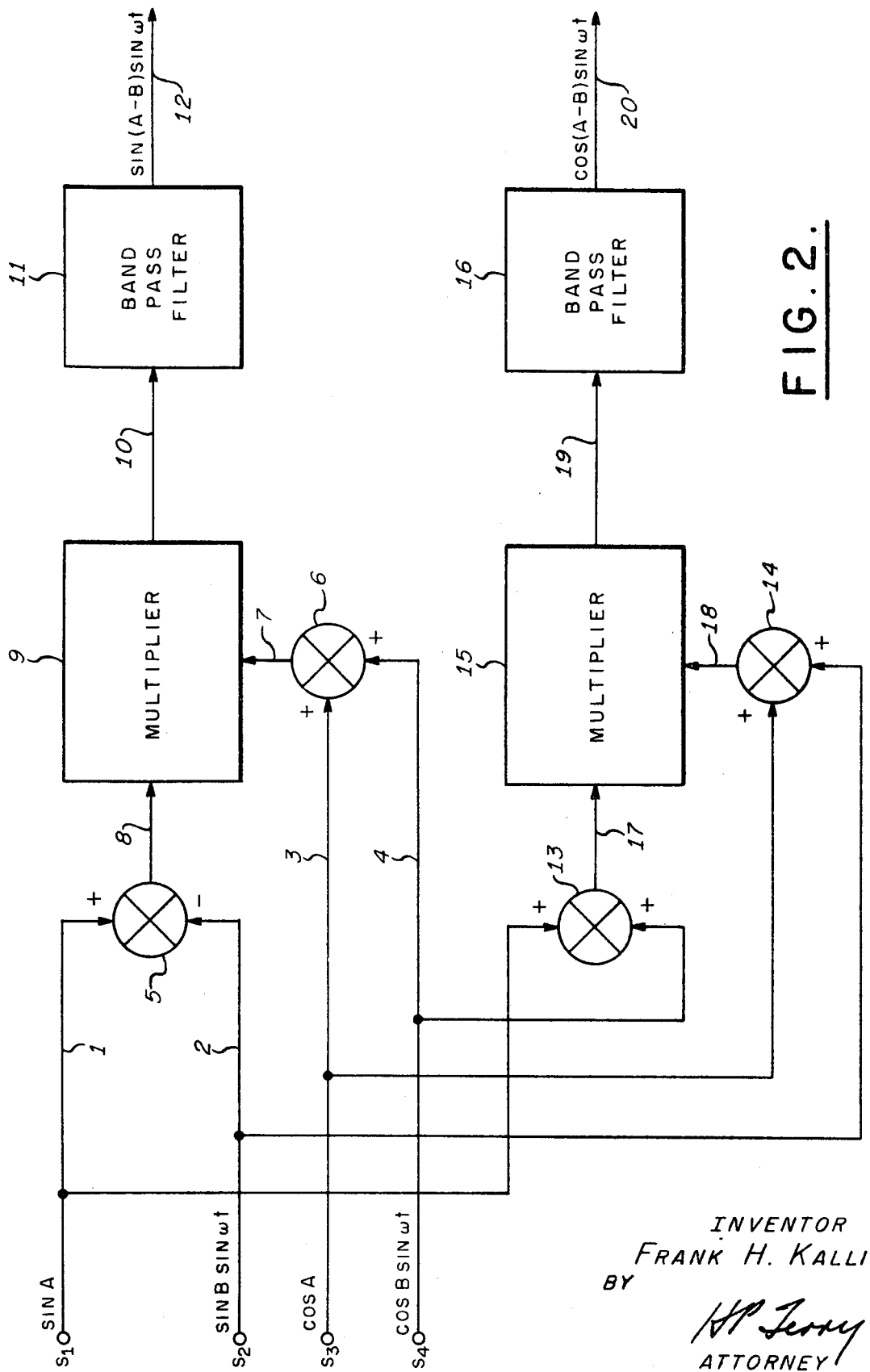
FIG. 2 illustrates the apparatus of FIG. 1 in a dual configuration performing the functional equivalent of a resolver.

While specific combinations of the input functions have been used in the apparatus of FIG. 1, it should be understood that the linear combinations can include other sums and differences of $S_1$, $S_2$, $S_3$ and $S_4$ in appropriate pairs for generating various trigonometric functions of angular sums and differences. For instance, FIG. 2 includes the apparatus of FIG. 1, designated by corresponding numerals, in combination with additional combiners 13 and 14, multiplier 15 and bandpass filter 16 for implementing a resolver function. Combiner 13 linearly adds signals $S_1$ and $S_4$ to provide a signal sin A +cos B sin wt on lead 17 connected to one input of multiplier 15. Likewise, combiner 14 linearly adds signals $S_2$ and $S_3$ to provide a signal cos A +sin B sin wt on lead 18 connected to the other input of multiplier 15. A simple mathematical analysis of the resulting product signal provided on output lead 19 of multiplier 15, in the manner described with reference to FIG. 1, indicates the presence of a signal component cos (A − B) sin wt which is readily separated from the other output components of multiplier 15 by means of bandpass filter 16. Thus, resolver terms sin (A − B) sin wt and cos (A − B) sin wt are provided respectively on output leads 12 and 20.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. Apparatus responsive to signals representative of functions of first and second angle variables for producing a signal proportional to a function of the algebraic difference between the angle variables, comprising means for combining a signal $S_1$ representative of a function of the first angle variable with a signal $S_2$ representative of a function of the second angle variable to produce a resultant combined signal, means for combining a signal $S_3$ representative of another function of the first angle variable with a signal $S_4$ representative of another function of the second angle variable to produce another resultant combined signal, the first angle variable being an amplitude modulation factor of a carrier component associated with signals $S_1$ and $S_3$ and the second angle variable being an amplitude modulation factor of another carrier component of different frequency associated with signals $S_2$ and $S_4$, and means for multiplying the two combined signals to produce a composite signal containing a signal component proportional to a function of the algebraic difference between the angle variables.

2. The apparatus of claim 1 wherein said resultant signal is equal to $S_1 - S_2$ and said another resultant signal is equal to $S_3 + S_4$.

3. The apparatus of claim 1 including a frequency selective device connected to receive the composite signal for separating the signal proportional to a function of the algebraic difference between the angle variables from the remainder of the composite signal.

4. The apparatus of claim 1 wherein the carrier component of the signals corresponding to one of the first and second angle variables is a d.c. component which is amplitude modulated in accordance with the instantaneous value of the related angle variable.

5. The apparatus of claim 1 in which the functions of the first and second angle variables are cyclically varying trigonometric functions.

6. The apparatus of claim 5 in which the functions of the first and second angle variables are respective sine and cosine functions.

7. The apparatus of claim 6 wherein the carrier component of the functions of one of the first and second angle variables is a d.c. component whereby the composite signal produced at the output of said multiplier includes a d.c. component, a second harmonic component of the carrier frequency of the function of the other of the first and second angle variables, and a component proportional to a trigonometric function of the algebraic difference between the angle variables.

8. The apparatus of claim 7 including a frequency selective device connected to receive the composite signal from said multiplier and provide at its output the signal proportional to a trigonometric function of the algebraic difference between the angle variables.

9. An all electronic resolver comprising means for receiving a plurality of variable input signals, two of said input signals being a function of a first variable angle which is an amplitude modulation factor of a carrier component of predetermined frequency associated with said two input signals and an additional two of said input signals being a function of a second variable angle which is an amplitude modulation factor of a carrier component of a different pre-determined frequency associated with said additional two input signals, first means for linearly combining a first pair of said input signals, second means for linearly combining a second pair of said input signals, third means for multiplying the resultant signal from said first means with the resultant signal of said second means, first frequency selective means for passing solely a signal component constituting an output of the electronic resolver proportional to a function of the algebraic difference of the variable signals of said first and second pair of input signals, fourth means for linearly combining a third pair of said input signals wherein one signal of said third pair is one of the signals in said first pair and the other signal of said third pair is one of the signals in said second pair, fifth means for linearly combining a fourth pair of said input signals wherein one signal of said fourth pair is the remaining one of the signals in said first pair and the other signal of said fourth pair is the remaining one of the signals in said second pair, sixth means for multiplying the resultant signal from said fourth means with the resultant signal of said fifth means, second frequency selective means for passing solely a signal component constituting another output of the electronic resolver proportional to a function of the algebraic difference of the variable signals of said third and fourth pair of input signals, and one signal of each of said pairs of signals being selected from said two input signals having one carrier component and the other signal of each of said pairs of signals being selected from said additional two input signals having a different carrier frequency component.

* * * * *